United States Patent [19]

Narumiya

[11] Patent Number: 5,082,374
[45] Date of Patent: Jan. 21, 1992

[54] LINEAR GUIDE DEVICE

[75] Inventor: Hisayoshi Narumiya, Osaka, Japan

[73] Assignee: Koyo Seiko Co., Ltd., Osaka, Japan

[21] Appl. No.: 607,806

[22] Filed: Nov. 1, 1990

[30] Foreign Application Priority Data

Nov. 9, 1989 [JP] Japan ............................. 1-291657
May 15, 1990 [JP] Japan ............................. 2-126333
Jun. 11, 1990 [JP] Japan ............................. 2-153554
Aug. 6, 1990 [JP] Japan ............................. 2-83477[U]

[51] Int. Cl.⁵ ............................................. F16C 29/06
[52] U.S. Cl. ..................................................... 384/45
[58] Field of Search ................................... 384/43–45

[56] References Cited

U.S. PATENT DOCUMENTS

| 4,637,739 | 1/1987 | Mattori | 384/45 |
| 4,869,600 | 9/1989 | Tonogai | 384/45 X |
| 4,932,067 | 6/1990 | Pester et al. | 384/45 |
| 4,983,049 | 1/1991 | Lecomte | 384/45 |

*Primary Examiner*—Thomas R. Hannon
*Attorney, Agent, or Firm*—Mason, Fenwick & Lawrence

[57] ABSTRACT

A linear guide device comprising a straight guide rail, and a movable body movable as fitted over the guide rail, the movable body comprising a movable block generally inverted U-shaped in cross section and having a pair of legs at its opposite sides, each of the legs being formed with a ball circulation channel in the form of a loop, and a plurality of balls movable through the channel in circulation and rollable between the movable block and the guide rail, the movable block comprising an end cap at each of its opposite ends and an intermediate member as the remaining portion, the ball circulation channel comprising a groovelike forward passage formed by a retainer in one side of the leg of the block intermediate member and facing the guide rail, a borelike return passage formed in the leg outwardly of the forward passage, and reverse passages each formed by fitting a guide member to each of the block end caps and interconnecting the corresponding ends of the forward and return passages, the block intermediate member being divided into a cage generally U-shaped in cross section and a central main portion, the cage including as an integral unit the leg portion on the lower side of the ball circulation channel, the leg portion on the laterally outer side of the return passage, the retainer portion and the guide member portions at the opposite ends.

12 Claims, 6 Drawing Sheets

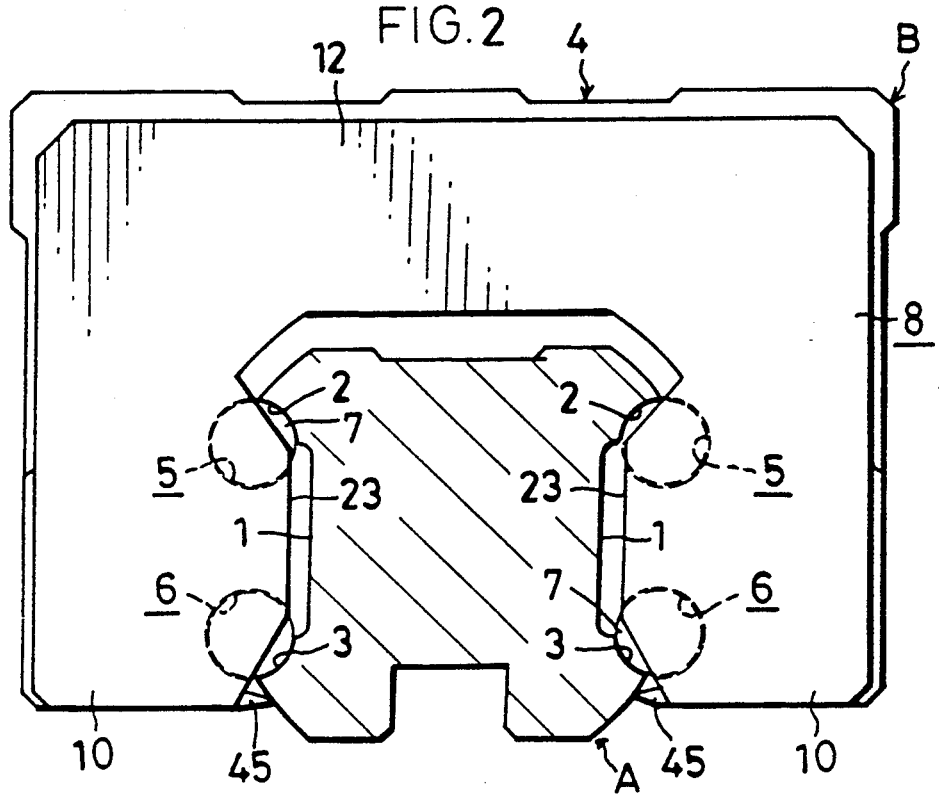
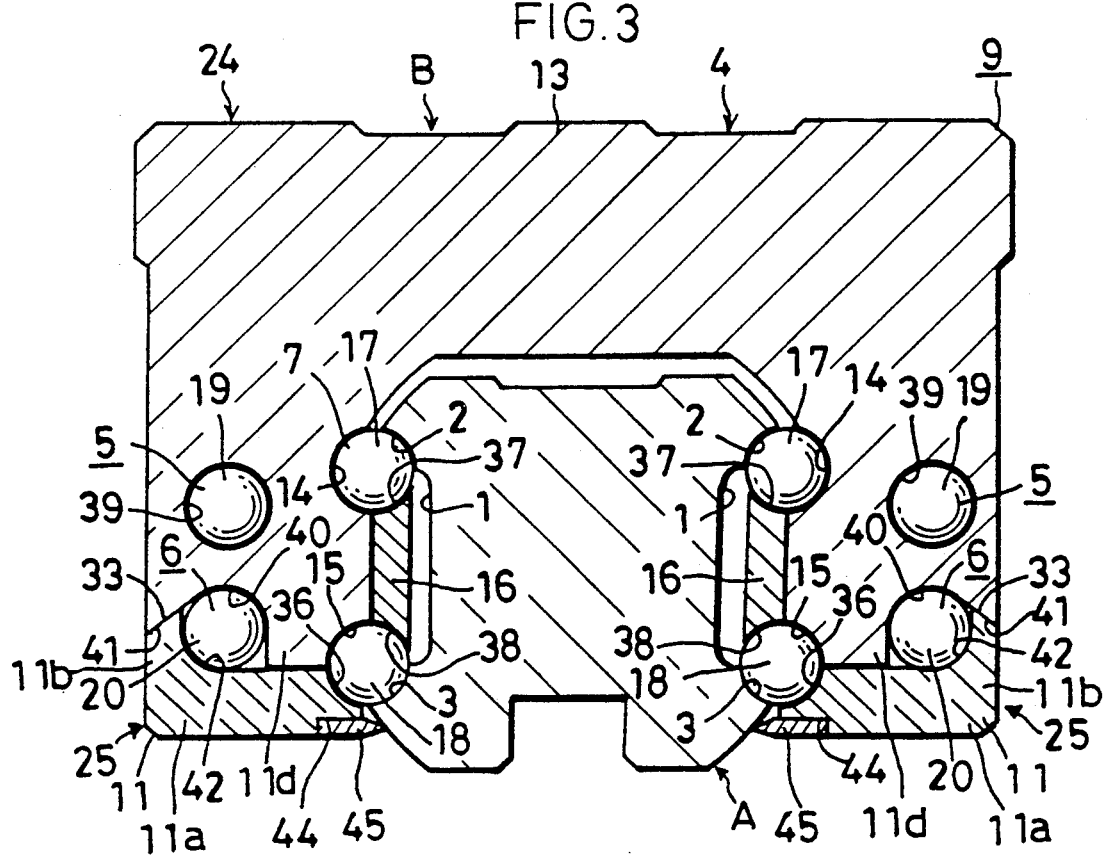

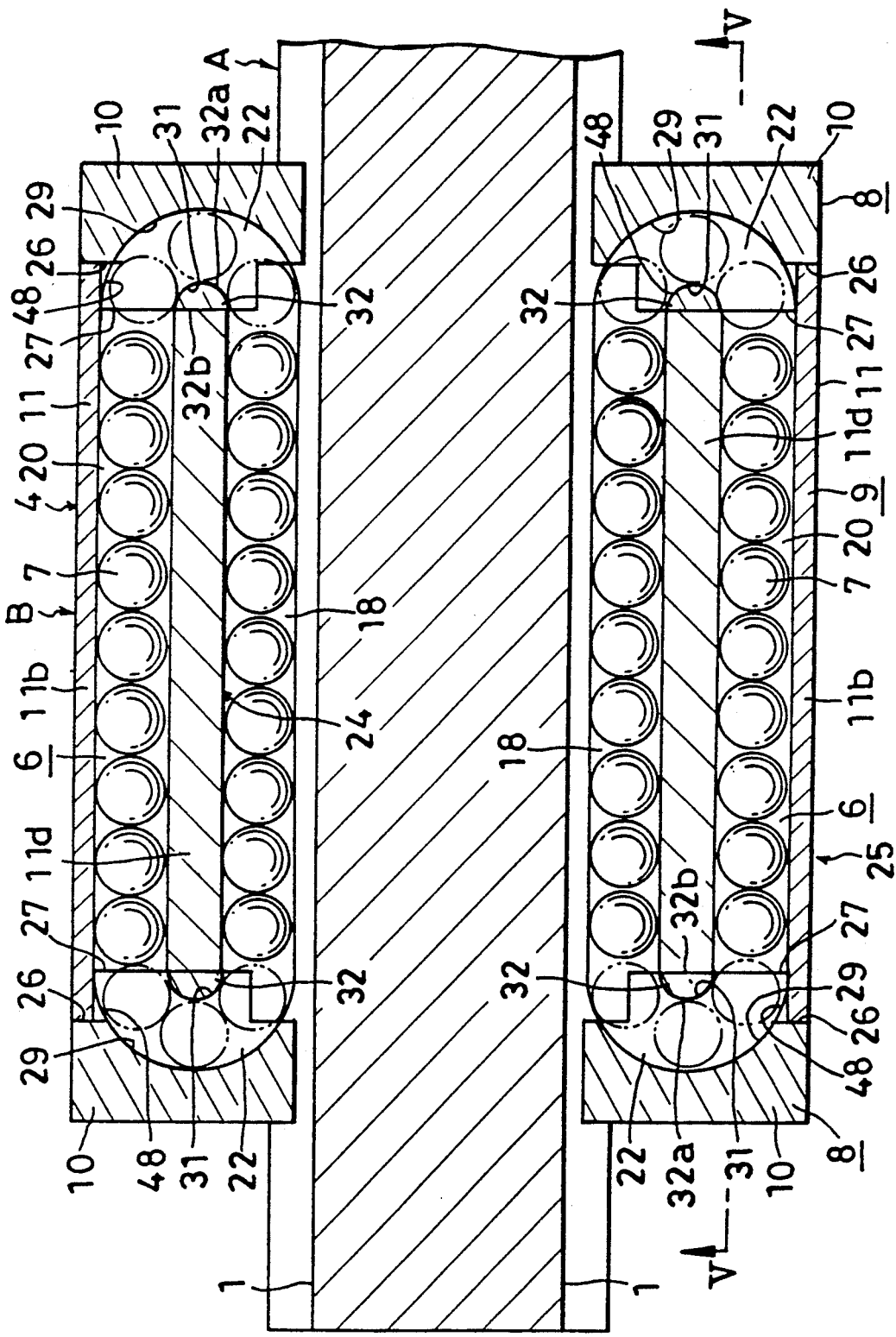

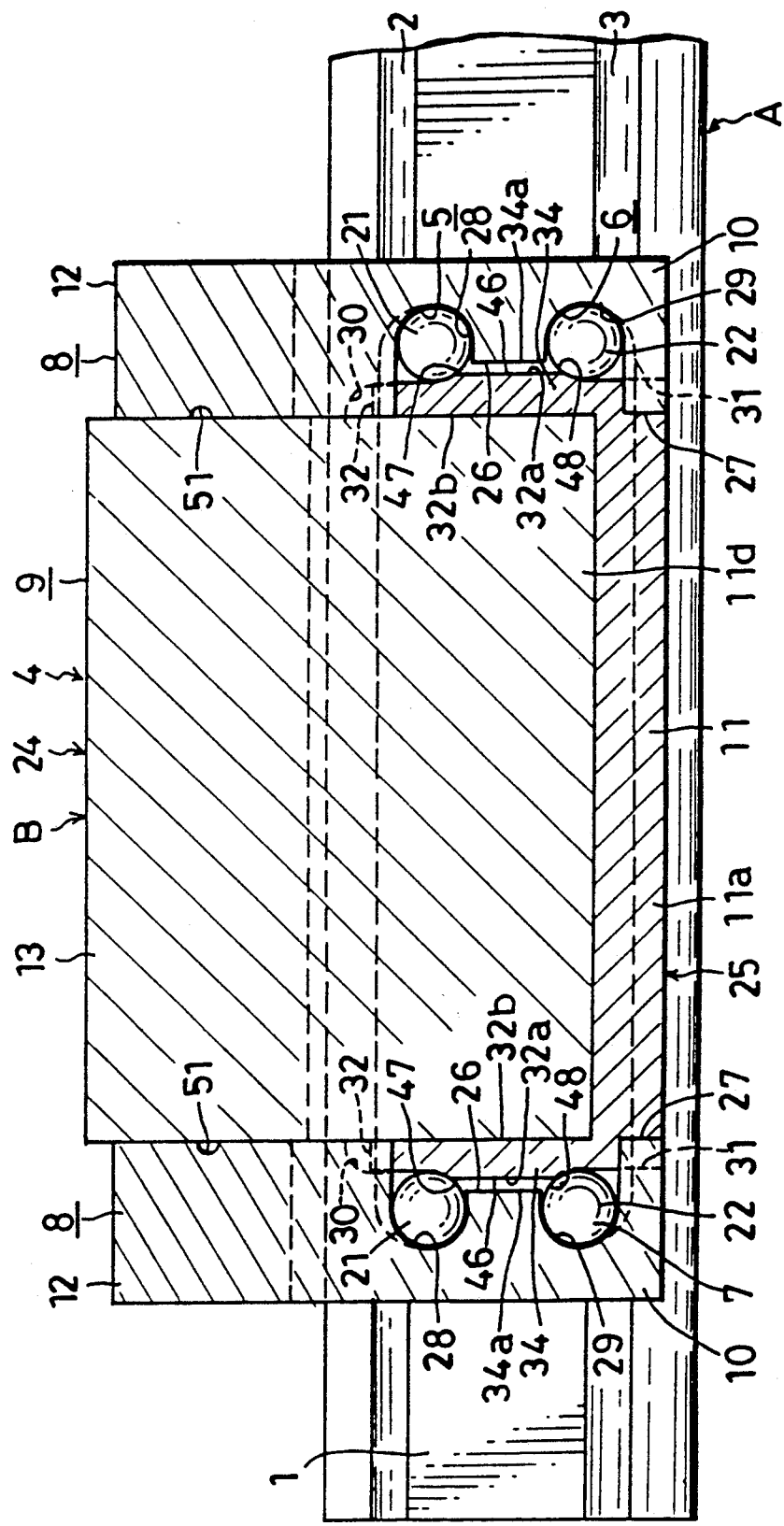

LINEAR GUIDE DEVICE

BACKGROUND OF THE INVENTION

The present invention relates to linear guide devices, and more particularly to a linear guide device comprising a straight guide rail, and a movable body movable as fitted over the guide rail.

In the specification and the appended claims, the terms, "front," "rear," "left" and "right" are used with reference to the direction of movement of the movable body.

The movable body of the linear guide device of the type mentioned comprises a movable block generally inverted U-shaped in cross section and having a pair of legs at its opposite sides, with a looped ball circulation channel formed in each of the legs, and a plurality of balls movable through the channel in circulation and rollable between the movable block and the guide rail. The movable block comprises an end cap at each of its opposite ends and an intermediate member as the remaining portion. The ball circulation channel comprises a groovelike forward passage formed by a retainer in one side of the leg of the block intermediate member and facing the guide rail, a borelike return passage formed in the leg outwardly of the forward passage, and reverse passages each formed by fitting a guide member to each of the block end caps and interconnecting the corresponding ends of the forward and return passages.

The movable block of the linear guide device has a complex construction and therefore can not be formed integrally in its entirety, so that it has been conventional practice to separately prepare the two end caps at the opposite ends, the intermediate member, the retainers at the respective sides and the guide members at the opposite sides and to assemble these components into the block.

Accordingly, the device has the problem of necessitating a large number of parts and many assembling steps. Especially, the assembly process is complex because the guide members to be fitted to the end caps are separate from other portions and because the retainers need to be fixed in place with bolts or screws. This problem becomes more serious in the case where upper and lower two ball circulation channels are formed in the leg at each side of the movable block.

SUMMARY OF THE INVENTION

The main object of the present invention is to overcome the above problem and to provide a linear guide device which consists of a reduced number of parts and which can be assembled by a decreased number of steps.

Other objects of the present invention will become more apparent from the following description.

The present invention provides a linear guide device which comprises a straight guide rail, and a movable body movable as fitted over the guide rail, the movable body comprising a movable block generally inverted U-shaped in cross section and having a pair of legs at its opposite sides, each of the legs being formed with a ball circulation channel in the form of a loop, and a plurality of balls movable through the channel in circulation and rollable between the movable block and the guide rail, the movable block comprising an end cap at each of its opposite ends and an intermediate member as the remaining portion, the ball circulation channel comprising a groovelike forward passage formed by a retainer in one side of the leg of the block intermediate member and facing the guide rail, a borelike return passage formed in the leg outwardly of the forward passage, and reverse passages each formed by fitting a guide member to each of the block end caps and interconnecting the corresponding ends of the forward and return passages, the block intermediate member being divided into a cage generally U-shaped in cross section and a central main portion, the cage including as an integral unit the leg portion on the lower side of the ball circulation channel, the leg portion on the laterally outer side of the return passage, the retainer portion and the guide member portions at the opposite ends of the intermediate member.

According to the present invention, the portion on the lower side of the circulation channel, the portion on the laterally outer side of the return passage, the retainer and the opposite end guide members, which are included in each leg of the block intermediate member, are integrally formed as a cage, so that the device is correspondingly reduced in the number of components and in the number of assembling steps. Especially because the guide members are integral with the retainer, the guide members can be installed in place easily, and the retainer can be positioned in place merely by fitting the guide members to the end caps and can be installed without necessitating bolts or screws. This serves to reduce the number of parts and the number of assembling steps.

The present invention will be described in greater detail with reference to the accompanying drawings.

BRIEF DESCRIPTION OF THE DRAWINGS

FIG. 2 is a view in section taken along the line II—II in FIG. 1;

FIG. 3 is a view in section taken along the line III-—III in FIG. 1;

FIG. 4 is a view in section taken along the line IV—IV in FIG. 1;

FIG. 5 is a view in section taken along the line V—V in FIG. 4;

DESCRIPTION OF THE PREFERRED EMBODIMENT

Figure 1:
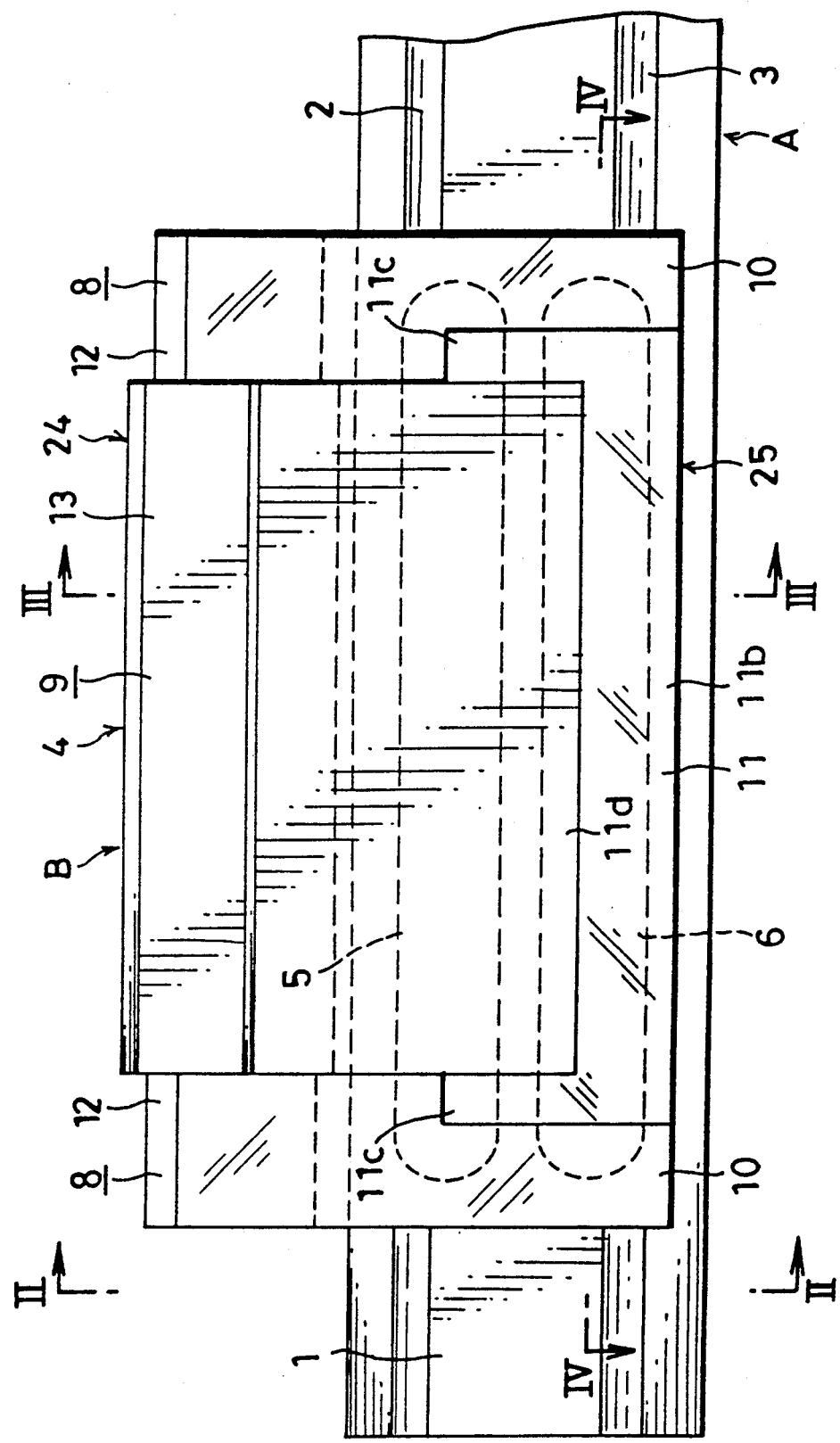
FIG. 1 is a side elevation showing an embodiment of the invention, i.e., a linear guide device, as assembled.

With reference to FIGS. 1 to 5 showing a linear guide device as assembled, the guide device comprises a straight guide rail A and a movable body B movable as fitted over the rail.

Used as the guide rail A is a round rail having an approximately square cross section and four corner portions partly forming a cylindrical surface. The rail A is formed in its respective right and left sides with shallow grooves 1 extending longitudinally thereof. Ball guide faces 2, 3 having a circular-arc cross section are formed respectively above and below the groove 1 in each side.

The movable body B comprises a movable block 4 having a generally inverted U-shaped cross section and fitted over the rail A, and a plurality of balls 7 movable in circulation through each of looped ball circulation channels 5, 6 formed in the movable block 4 to roll along between the block and each of the guide faces 2, 3.

The movable block 4 as assembled comprises a pair of end caps 8 at its front and rear ends, and an intermediate member 9 as the remaining portion. Each end cap 8 and the intermediate member 9 respectively comprise legs 10, 11 at the opposite sides, and connecting portions 12, 13 each interconnecting the upper ends of the opposed legs 10 or 11. The movable block 4 has curved corner portions in conformity with the round guide rail A.

As will be described in detail below, the ball circulation channels 5, 6 are formed at two different levels, i.e., at upper and lower levels, respectively, in the legs 10, 11 of the movable block 4 at both sides thereof. Each leg 11 of the block intermediate member 9 is formed in the laterally inner side thereof facing the rail A with upper and lower two grooves 14, 15 having a circular-arc cross section and facing the guide faces 2, 3 of the rail A, respectively. A retainer 16 is provided between the upper and lower grooves 14, 15. The upper groove 14 and the upper portion of the retainer 16 provide an upper forward passage 17. The lower groove 15 and the lower portion of the retainer 16 form a lower forward passage 18. Each leg 11 of the intermediate member 9 is formed with upper and lower two borelike return passages 19, 20 outwardly of the respective forward passages 17, 18. An upper semicircular reverse passage 21 is formed between each leg 10 of each end cap 8 and the end of the intermediate member 9 adjacent to the cap to interconnect the corresponding ends of the upper forward passage 17 and the upper return passage 19. The upper circulation channel 5 is formed by the forward passage 17, the return passage 19 and the reverse passages 21 at the respective ends of the member 9. Similarly, a lower semicircular reverse passage 22 is formed between each leg 10 of each end cap 3 and the end of the intermediate member 9 adjacent to the cap to interconnect the corresponding ends of the lower forward passage 18 and the lower return passage 20. The lower circulation channel 6 is formed by the forward passage 18, the return passage 20 and the reverse passages 22 at the respective ends of the member 9.

The balls 7 are enclosed in each of the circulation channels 5, 6. The balls 7 present in the forward passages 17 of the upper circulation channels 5 are in contact with the upper guide faces 2 of the rail A at its opposite sides. The balls 7 present in the forward passages 18 of the lower circulation channels 6 are in contact with the lower guide faces 3 of the rail A at its opposite sides.

A projection 23 opposed to the groove 1 of the rail A is provided on the laterally inner side of each leg 10 of the end cap 8 at each end of the movable block 4.

When the movable block 4 moves along the rail A, the balls 7 circulate through each circulation channel 5 (6) while rolling on each guide face 2 (3) of the rail A in the following manner. With the movement of the block 4, the balls 7 in the forward passage 17 (18) of the channel 5 (6) roll along the guide face 2 (3) of the rail A rearwardly of the forward passage 17 (18), and therefore enter the reverse passage 21 (22) one after another, thereby causing the balls 7 in the reverse passage 21 (22) to enter the return passage 19 (20) one after another. The balls 7 in the return passage 19 (20) roll into the forward passage 17 (18) one after another.

Figure 6:
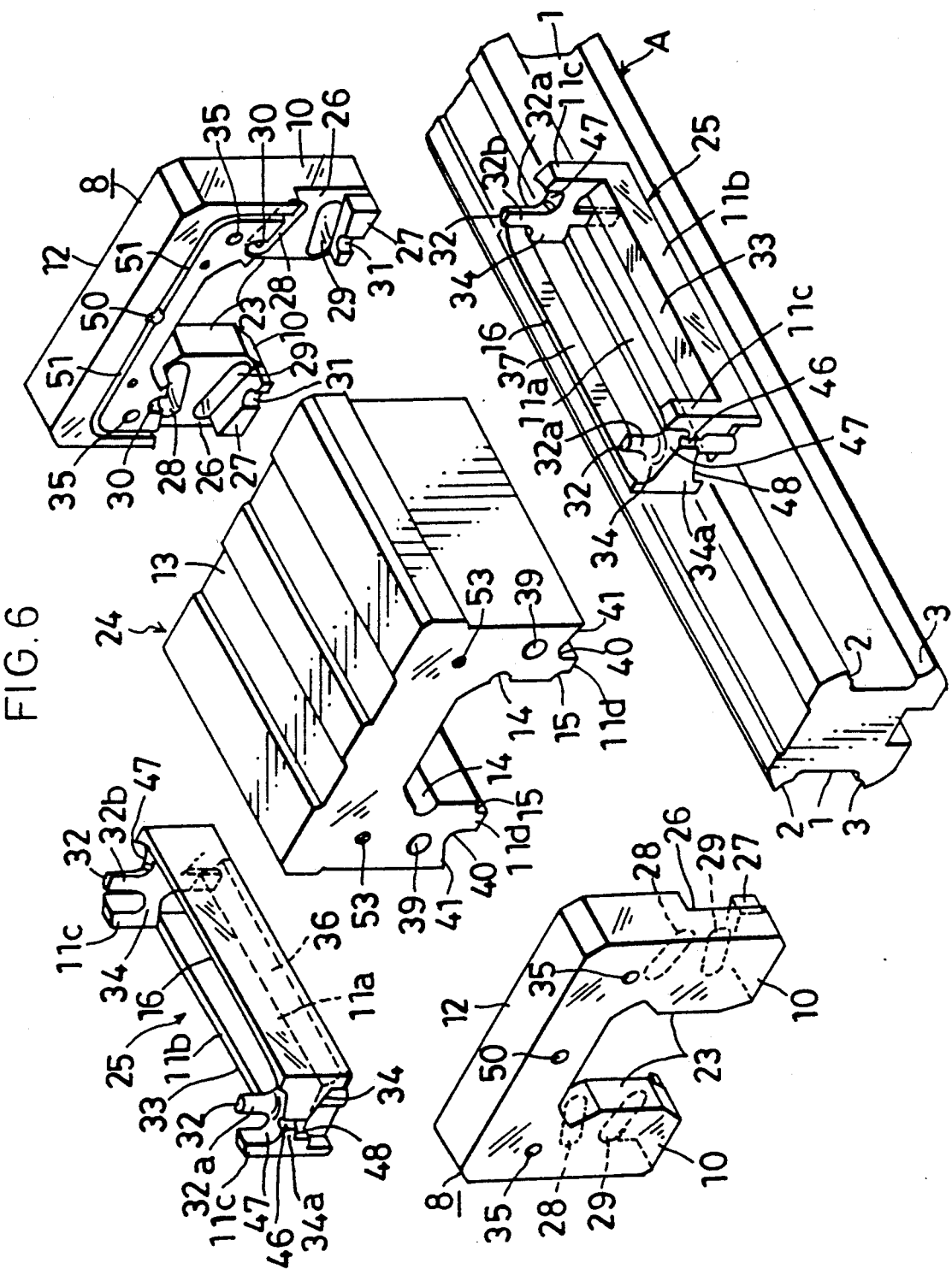
FIG. 6 is an exploded perspective view of the linear guide device.

As shown in FIG. 6, the movable block 4 comprises the combination of two end caps 8, central main portion 24 and two cages 25.

Figure 7:
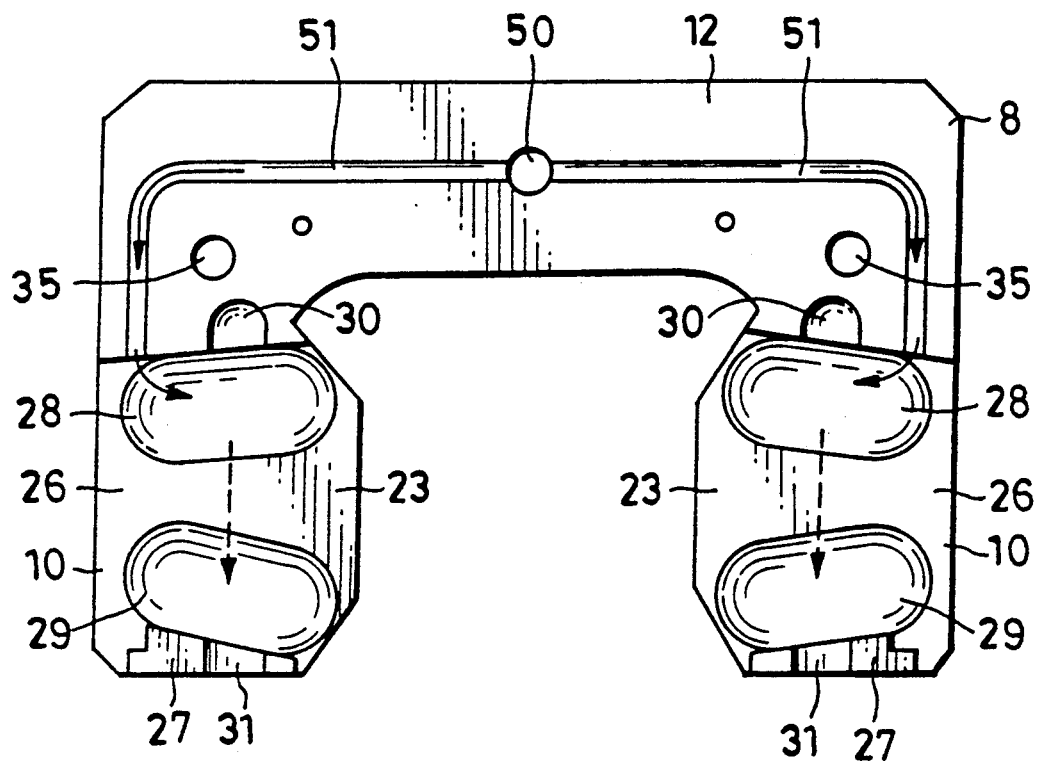
FIG. 7 is a view showing the inner side of an end cap as it is seen longitudinally of the device.

With reference to FIG. 7, each leg 10 of the end cap 8 has a groove 26 formed in its inner surface and extending over the entire lateral width of the leg. A ridge 27 projecting inward lengthwise of the block 4 is formed under the groove 26. The upper and lower walls defining the groove 26 are so slanted as to extend laterally inward with a slightly increasing distance therebetween. The bottom surface of the groove 26 facing inward lengthwise of the block has shallow upper and lower recesses 28, 29 each in the form of a circular arc. A cutout 31 in the form of a groove of semicircular cross section is formed in the top of the ridge 27 at a laterally intermediate portion thereof. The inner surface of the leg 10 is further formed with a semicircular cavity 30 positioned above the groove 26 and communicating at its lower end with the groove 26. The end cap connecting portion 12 has a grease nipple mount hole 50 positioned at its lateral midportion and extending through the portion 12 lengthwise of the block 4. An unillustrated grease nipple is fixed in the outer end of the mount hole 50. The inner surface of the end cap 8 has grease supply grooves 51 each communicating at its one end with the nipple mount holes 50 and at the other end thereof with the groove 26. The end cap 8 has bores 35 extending through the respective ends of the connecting portion 12 for inserting therethrough bolts (not shown) for fastening the end cap 8 to the central main portion 24.

Each cage 25 is in the form of an integral unit comprising a horizontal plate 11a forming the lower portion of the leg 11 of the block intermediate member 9, a vertical plate 11b forming the portion of the leg 11 outward from the return passages 19, 20, the retainer 16, and guide members 32 positioned at the respective ends of the member 9 and each in the form of a post of semicircular cross section. A step 44 is formed in the lower surface of the horizontal plate 11a at its laterally inner edge. A seal 45 made of a material having rubberlike elasticity is secured at its base portion to the step 44 with an adhesive (not shown). The tip of the seal 45 is slidably in contact with the side surface of the guide rail A below the lower guide face 3. The seal 45 prevents leakage of grease and ingress of extraneous matter from outside. The vertical plate 11b extends upward from the laterally outer edge of the horizontal plate 11a. Posts 11c are formed integrally with the front and rear ends of the vertical plate 11b. The vertical plate 11b has a slanting top surface 33 facing obliquely outward laterally. The retainer 16 is in the form of a vertical plate and has its front and rear ends integrally joined with the respective posts 11c by connecting portions 34. The retainer 16 is positioned above the laterally inner edge of the horizontal plate 11a. The guide members 32 are integral with the respective front and rear ends of the horizontal plate 11a, extend upward and have lower portions projecting outward from the respective front and rear ends of the plate 11a. With respect to the lengthwise direction of the block 4, the outer side of each guide member 32 has a cylindrical face 32a, and the inner side thereof has a flat face 32b. The guide member 32 is integral at a vertically intermediate portion thereof with the connecting portion 34. The flat face 32b of the guide member 32 is flush with the inner faces of the post 11c and the connecting portion 34. With respect to the above lengthwise direction, the connecting portion 34 has a flat outer face 34a which is positioned outward from the cylindrical face 32a of the guide member 32 and is flush with the outer face of the post 11c. A grease supply groove 46 is formed in the flat face 34a and has an upper end opening at the upper surface of the connecting portion 34 and a lower end opening at the lower surface thereof. The grease supply groove 46 need not be formed in both the connecting portions 34 but may be formed in one of the portions 34. The lower edge of the retainer 16 is spaced by a predetermined distance from the laterally inner edge of the horizontal plate 11a. The inner edge of the horizontal plate 11a has a ball guide face 36. The upper and lower edges of the retainer 16 also have ball guide faces 37, 38, respectively. The junction of the horizontal plate 11a and the vertical plate 11b also has a ball guide face 42. The upper and lower surfaces of the connecting portion 34 further provide ball guide faces respectively. Around the lateral sides of each guide member 32 to the outer side thereof (lengthwise of the block) at the upper and lower sides of the connecting portion 34, ball guide portions 47 48 partly providing the reverse passages 21, 22 are formed by the cylindrical face 32a of the guide member 32, upper and lower surfaces of the connecting portion 34, laterally inner face of the post 11c and laterally inner face of the retainer 16. The lateral width of the outer end (lengthwise of the block) of each of the ball guide portions 47, 48 is larger than the diameter of the ball 7 but not larger than three times the ball diameter.

The central main portion 24 comprises the opposed legs 11 of the intermediate member 9 other than the cages 25, i.e., cores 11d, and the connecting portion 13 integral with the cores 11d. The length of the main portion 24 is slightly smaller than the distance between the flat faces 32b of the front and rear guide members 32 of the cage 25. The groove 14 providing the upper forward passage 17 is formed in the upper portion of the laterally inner surface of each core 11d. The groove 15 providing the lower forward passage 18 is formed in the lower portion of the same surface. A bore 39 providing the upper return passage 19 extends through the core 11d and is positioned laterally outwardly of the groove 14 slightly therebelow. A groove 40 opened laterally and downwardly and providing the lower return passage 20 is formed in the core 11d and positioned laterally outwardly of and slightly above the lower groove 15. The wall of the core defining the groove 40 and extending laterally outward has a slanting surface 41 facing obliquely inward laterally. A screw bore 53 is formed in each of the right and left ends of the connecting portion 13 of the central main portion 24.

The main portion 24 and the cages 25 are assembled with each core 11d of the main portion 24 fitted in a space defined by the vertical plate 11b, retainer 16 and front and rear guide members 32 and connecting portions 34 of each cage 25. Consequently, the lower surface of the core 11d is in contact with the upper surface of the horizontal plate 11a between the guide members 32, and the front and rear ends are in contact with the flat faces 32b of the front and rear guide members 32 and the inner flat faces of the connecting portions 34. Further the laterally outer portion of the core 11d fits in between the front and rear posts 11c, and the slanting surface 41 of the core 11d is in intimate contact with the slanting surface 33 of the vertical plate 11b. The lower groove 40 of each core 11d and the guide face 42 at the junction of the horizontal plate 11a and the vertical plate 11b form the lower return passage 20. The laterally inner surface of the core 11d is in contact with the retainer 16. The upper groove 14 of the core 11d and the upper edge guide face 37 of the retainer 16 form the upper forward passage 17. The lower forward passage 18 is formed by the lower groove 15 of the core 11d and the guide faces 36, 38 of the horizontal plate 11a and the retainer lower edge.

In this state, the end caps 8 are attached to the opposite ends of the main portion 24 and the cages 25 in the following manner. The retainer 16, post 11c and connecting portion 34 of each cage 25 are fitted into the groove 26 in each end cap 8 to contact the post 11c and the outer flat face 34a of the connecting portion 34 with the bottom of the groove 26 in the end cap 8, whereby the end face of the connecting portion 12 of the end cap 8 is brought into contact with the end face of the main portion 24. The end cap 8 is fastened to the main portion 24 with bolts or the like inserted through the bores 35 of the end cap and driven into the screw bores 53 in the main portion 24. The cage 25 is positioned in place at this time by each end of the cage 25 fitted in the groove 26 of the end cap 8, and each cage 25 is fixed in place merely by fastening the end caps 8 to the opposite ends of the main portion 24. With each end cap 8 thus installed in place, the lower portion of each guide member 32 of the cage 25 fits in the cutout 31 in the ridge 27 of the end cap 8, with the upper portion thereof fitting in the cavity 30 of the end cap 8. Each upper reverse passage 21 is formed by the upper portion of the guide member 32, the upper ball guide portion 47 of the connecting portion and the upper recess 28 of the end cap 8 and is held in communication with the upper forward and return passages 17, 19 to form the upper ball circulation channel 5. Further each lower reverse passage 22 is formed by the lower portion of the guide member 32, the lower ball guide portion 48 of the connecting portion 34 and the lower recess 29 of the end cap 8 and is held in communication with the lower forward and return passages 18, 20 to form the lower ball circulation channel 6.

The balls 7 are placed into the circulation cannels 5, 6 in the following manner. First, one of the end caps 8 is attached to the main portion 24 and the cages 25 each at its one end. From the ball guide portions 47, 48 on the top and bottom sides of the connecting portion 34 of each cage 25 at the lateral sides of the guide member 32 at the other end, balls 7 are placed into the upper and lower forward passages 17, 18 and return passages 19, 20. The remaining several balls 7 are temporarily held in the ball guide portions 47, 48 and to the guide member 32 with grease. In this state, the other end cap 8 is attached to the other ends of the main portion 24 and the cages.

When the movable block 4 is thus assembled, the reverse passage 21 of the upper circulation channel 5 communicates with the reverse passage 22 of the lower circulation channel 6 through the grease supply groove 46 formed in the inner flat face 34a of the connecting portion 34, so that the grease supplied to the upper circulation channel 5 is fed to the lower channel 6 via the groove 46. More specifically, the grease injected from the nipple fixed in the mount hole 50 passes through the supply groove 51 into the upper reverse passage 21 and is supplied to the upper circulation channel 5. The grease injected into the upper reverse passage 21 passes through the groove 46 formed in the flat face 34a of the connecting portion 34, enters the lower reverse passage 22 and is supplied to the lower circulation channel 6. When the ball 7 reversely changes its course, the radially outer side of the reverse passage forming portion is subjected to a great stress, whereas the radially inward side thereof is not subjected to a great stress. The grease supply groove 46 is formed in the outer flat face 34a of the cage connecting portion 34 which is the radially inward side not subjected to a great stress, so that the groove 46 will not hamper smooth reversal of the balls 7.

With the foregoing construction, the guide members 32 are integral with the cage 25 and are therefore easy to install in place, and the retainer 16 can be positioned in place merely by fixing the opposite ends of the cage 25 to the end caps 8 without the necessity of fastening the retainer 16 with bolts or screws. Furthermore, the lower portion of the guide member 32 is integral with the horizontal plate 11a, and an intermediate portion of the guide member 32 is integrally joined to the post 11c and the retainer 16, so that the guide member 32, even if slender, retains the desired strength.

The cage 25 is usually made of synthetic resin. Accordingly, an intermediate portion of the vertical plate 11b is liable to deform laterally outward if the opposite ends of the cage 25 are merely fixed to the end caps 8. However, the slanting top surface 33 of the vertical plate 11b facing obliquely outward is in contact with the obliquely inward slanting surface 41 of the central main portion 24. This obviates the outward deformation of the intermediate portion of the vertical plate 11b even if an intermediate portion of the cage 25 is fastened to the main portion 24 as by a screw. As a result, the balls 7 are smoothly rollable in circulation with reduced resistance.

Since the guide rail A is in the form of a round rail, the device is usable to provide a ball spline. The legs of the movable block 4 have curved corner portions in conformity with the round guide rail A. This imparts improved rigidity to the legs 11 against horizontal moment, rendering the guide device usable as a precision device.

The forward passage 17 (18) and the return passage 19 (20) are at different levels. More specifically, the forward passage 17 of the upper channel 5 is at a higher level than the return passage 19 thereof. With the lower channel 6, the forward passage 18 is at a lower level than the return passage 20. This gives a larger turning radius to the balls 7, rendering the balls 7 rollable more easily toward the direction of angle of contact.

The lateral width of the outer end of the ball guide 47 (48) is not larger than three times the diameter of the balls 7, so that the ball 7 can be temporarily held in place with grease reliably without falling off.

The cylindrical face 32a of the guide member 32 may be formed with a circular-arc groove serving as a portion of the reverse passage 21 (22). The ball circulation channels 5, 6 are not limited in number to two, as arranged one above the other.

What is claimed is:

1. A linear guide device comprising a straight guide rail, and a movable body movable as fitted over the guide rail, the movable body comprising a movable block generally inverted U-shaped in cross section and having a pair of legs at its opposite sides, each of the legs being formed with a ball circulation channel in the form of a loop, and a plurality of balls movable through the channel in circulation and rollable between the movable block and the guide rail, the movable block comprising an end cap at each of its opposite ends and an intermediate member between facing inner surfaces of said end caps as the remaining portion, the ball circulation channel comprising a groovelike forward passage formed by a retainer in one side of the leg of the block intermediate member and facing the guide rail, a borelike return passage formed in the leg outwardly of the forward passage, and reverse passages each formed by fitting a guide member to said inner surface of each of the block end caps and interconnecting the corresponding ends of the forward and return passages, the block intermediate member being divided into a cage generally U-shaped in cross section and a central main portion, the cage including as an integral unit the leg portion on the lower side of the ball circulation channel, the leg portion on the laterally outer side of the return passage, the retainer portion and the guide member portions at the opposite ends of the intermediate member.

2. A linear guide device as defined in claim 1 wherein upper and lower two ball circulation channels are formed in each leg of the movable block, and the cage comprises the leg portion on the lower side of the lower circulation channel, the leg portion on the, laterally outer side of the return passage of the lower circulation channel, the retainer and the guide members which are formed integrally, the lower portions of the guide members being integral with the portion on the lower side of the lower circulation channel, the portions of the guide members between the upper and lower circulation channels being integral with the portion on the outer side of the return passage and with the retainer.

3. A linear guide device as defined in claim 2 wherein the face of the movable block intermediate member in contact with one of the end caps is formed with a grease supply groove for holding the reverse passages of the two circulation channels in communication with each other to supply grease from the upper circulation channel to the lower circulation channel.

4. A linear guide device as defined in claim 1 wherein the guide rail is in the form of a round rail having an approximately square cross section and four corner portions partly forming a cylindrical surface.

5. A linear guide device as defined in claim 1 wherein the legs of the movable block have curved corner portions.

6. A linear guide device as defined in claim 1 wherein the forward passage and the return passage of the ball circulation channel are positioned at different levels.

7. A linear guide device as defined in claim 1 wherein the portion of the cage laterally outward from the return passage of the circulation channel is in the form of a vertical plate having a slanting top surface facing obliquely outward laterally, and the slanting top face is in contact with a slanting surface of the central main portion facing obliquely inward laterally.

8. A linear guide device as defined in claim 1 wherein the cage is made of synthetic resin, and a seal member made of a material having rubberlike elasticity is joined to the portion of the cage under the circulation channel with the tip of the seal member slidably in contact with the side surface of the guide rail.

9. A linear guide device as defined in claim 8 wherein the seal member is joined to the cage portion with an adhesive.

10. A linear guide device as defined in claim 8 wherein the seal member is joined to the cage portion by thermal bonding.

11. A linear guide device as defined in claim 1 wherein a ball guide portion is formed around the lateral sides of the guide member to the outer side thereof.

12. A linear guide device as defined in claim 11 wherein the outer end, lengthwise of the movable block, of the ball guide portion has a lateral width not larger than three times the diameter of the balls.

* * * * *